(12) United States Patent
Winner

(10) Patent No.: US 6,520,454 B2
(45) Date of Patent: Feb. 18, 2003

(54) CONTROL LINE ASSEMBLY FOR KITES

(76) Inventor: William K. Winner, P.O. Box 1127, White Salmon, WA (US) 98672

( * ) Notice: Subject to any disclaimer, the term of this patent is extended or adjusted under 35 U.S.C. 154(b) by 0 days.

(21) Appl. No.: 10/055,598

(22) Filed: Jan. 22, 2002

(65) Prior Publication Data

US 2002/0185570 A1 Dec. 12, 2002

Related U.S. Application Data

(60) Provisional application No. 60/297,808, filed on Jun. 12, 2001.

(51) Int. Cl.⁷ .................................................. A63H 27/08
(52) U.S. Cl. .................................................. 244/155 A
(58) Field of Search ...................... 244/155 A, 155 R, 244/153 R, 142, 145, 152

(56) References Cited

U.S. PATENT DOCUMENTS

| | | | |
|---|---|---|---|
| 4,129,272 A | * 12/1978 | Jones et al. | 244/145 |
| 4,363,458 A | * 12/1982 | Jones et al. | 244/145 |
| 4,406,433 A | * 9/1983 | Radkey et al. | 244/145 |
| 4,424,945 A | * 1/1984 | Dell | 244/13 |
| 4,708,078 A | 11/1987 | Legaignoux et al. | |
| 4,846,424 A | * 7/1989 | Prouty | 244/145 |
| 4,892,272 A | * 1/1990 | Hadzicki | 244/153 R |
| 5,000,403 A | * 3/1991 | D'Alto | 244/155 A |
| 5,012,993 A | * 5/1991 | Schafroth | 244/142 |
| 5,120,006 A | * 6/1992 | Hadzicki | 244/153 R |
| 5,213,289 A | * 5/1993 | Barresi | 244/145 |
| 5,328,134 A | * 7/1994 | Powers | 244/153 R |
| 5,366,182 A | 11/1994 | Roeseler et al. | |
| 5,417,390 A | * 5/1995 | Southwick | 244/153 R |
| 5,433,401 A | * 7/1995 | Ricketts | 244/153 R |
| 5,538,204 A | * 7/1996 | Corbella | 244/153 R |
| 5,556,057 A | * 9/1996 | Davies | 244/153 R |
| 6,131,532 A | 10/2000 | Winner et al. | |

FOREIGN PATENT DOCUMENTS

| | | |
|---|---|---|
| FR | 2698847 | 6/1994 |
| FR | 2762583 | 10/1998 |

* cited by examiner

Primary Examiner—Peter M. Poon
Assistant Examiner—Kevin Jakel
(74) Attorney, Agent, or Firm—Garrison & Assoc. PS; David L. Garrison; William L. Haynes

(57) ABSTRACT

A kite control assembly permitting arch-type kites with four attachment points to be flown with two control lines and further including changeable length line elements which may be set to cause particular performance by the kite under given wind conditions and to make the kite optimally maneuverable. Cross bridles, changeable in length, may be used to alter the turning radius of the kite in various wind conditions. Line guides and line stops may be provided for rapidly de-powering the kite.

15 Claims, 3 Drawing Sheets

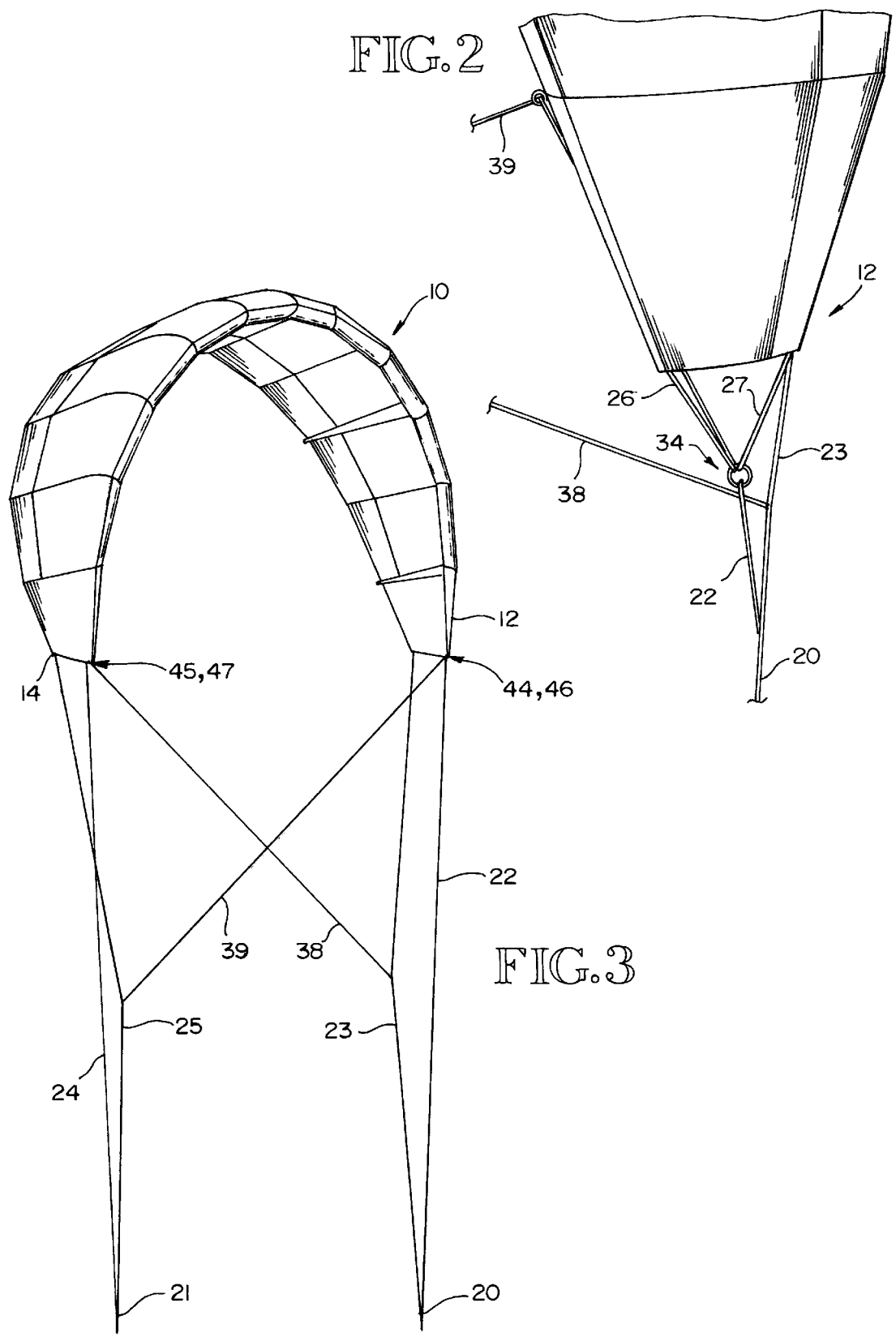

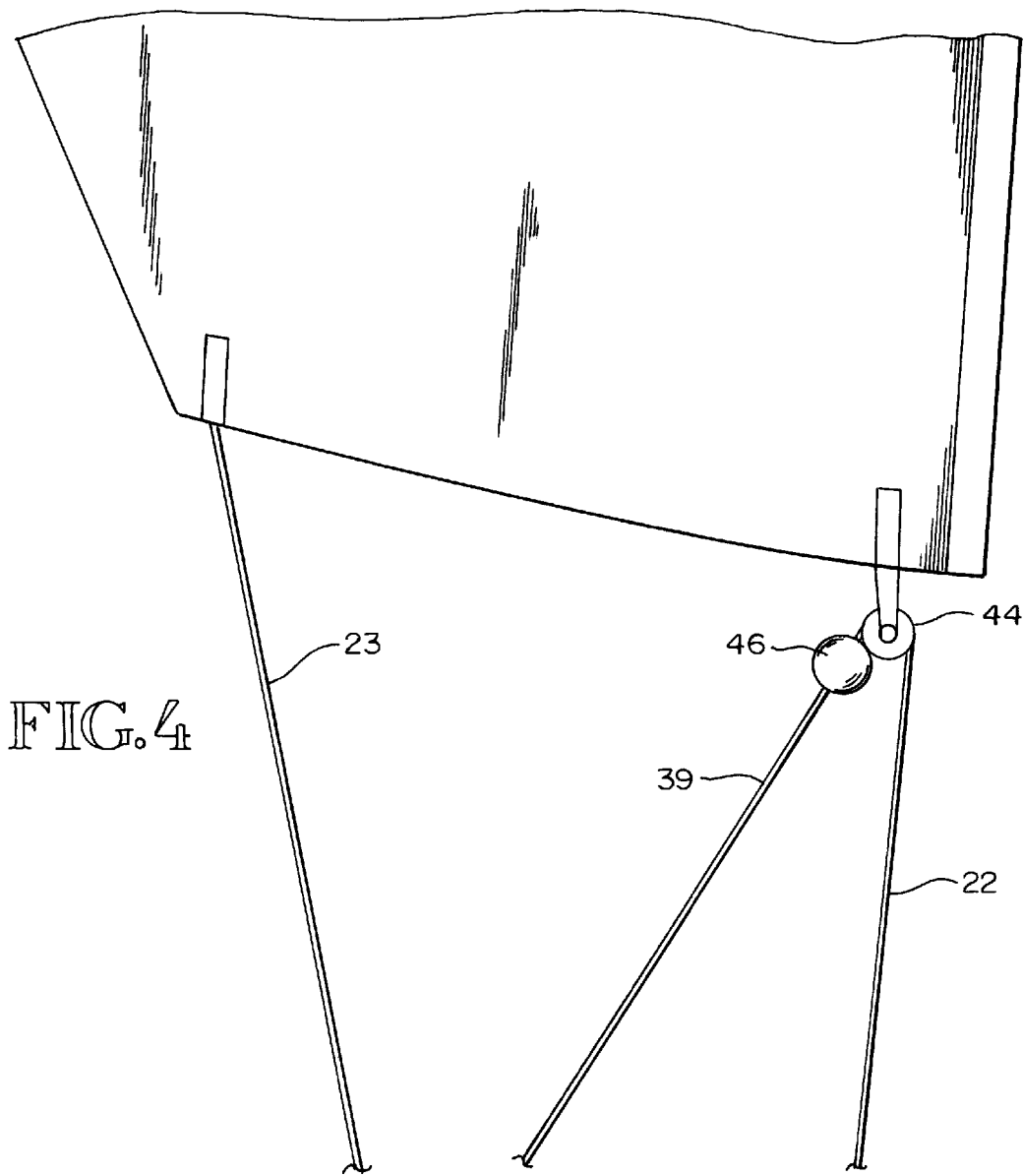

CONTROL LINE ASSEMBLY FOR KITES

CROSS-REFERENCE TO RELATED APPLICATIONS

This application claims the benefit of U.S. Provisional Application Serial No. 60/297,808, entitled Control Line System for Inflatable Kite, filed Jun. 12, 2001.

TECHNICAL FIELD

The invention relates to kites used for both traction and non-traction purposes, and for both recreational and non-recreational purposes. In particular, this invention describes a control line assembly for kites of the type that maintain a deeply arched shape while flying, and which attach to the primary control means at two points on each end of the kite. Kites of this type can take any of several forms: inflatable kites, ram air foil kites, and kites with rigid or semi-rigid spars, or a combination of air-type bladders and ram air inflation.

BACKGROUND OF THE INVENTION

While the use of kites to deliver tractive force to vehicles is not a new concept, recent developments in the field of traction kiting has increased interest in kites that are useful for a variety of applications such as recreation, auxiliary power for watercraft, and even as tractive power for life rafts and sailors adrift at sea. These developments have also increased interest in kites that are not used for traction purposes but which are suitable for training potential users of traction kites.

Kites suitable for these applications are usually of the deeply arched, four-attachment-point type. They have strong anhedral when viewed from in front or behind and typically include a total of four primary attachment points for control lines, two points at each end of the kite. They can further be categorized as two line or four-line, depending on the number of control lines used to fly them.

Traditionally, two-line kites of this general type have pointed ends. These pointed ends are connected to the two control lines by means of two primary bridle lines that are situated so as to take most of the flying loads generated by the kite. Four additional bridle lines attach to the kite, or slide through line guides that are attached to the kite, and serve to provide the kite with steering capabilities. Users can make slight adjustments to kite power and steering quickness by adjusting the lengths of these lightly-loaded bridle lines. The kite control lines are also attached to a control device, usually a bar.

All kites of this type will steer from side to side when the user pulls alternately on one kite line then the other. For example, if a user wants to turn a kite to his or her left, he or she pulls on the left-hand control line, or left-hand side of the control bar. A benefit of two-line kites is slow steering, for those that want slow steering. This is a useful feature for both novices and some expert users.

All kites of this type can also be leashed to the user in a manner that permits the kite to remain attached to the user when the user releases the control bar. For safety reasons, it is necessary that the kite be leashed to the user in such a way that the kite de-powers when the control bar is released. An advantage of a two-line kite over a four-line kite is that the control lines of the two-line kite are less likely to tangle when the user releases the control bar. This is particularly useful for novice users.

Four line kites of the type being discussed here generally have truncated ends, as opposed to the pointed ends of two-line kites, and they typically have no bridle lines. The four kite control lines attach directly to the four primary attachment points on the ends of the kite. The control lines are usually attached to a control bar, and the user steers a four-line kite in precisely the same way as he or she steers a two-line kite. Pull on the left side of the bar and the kite steers to the left.

Four-line kites of this type can be trimmed to the wind in such a way that the force produced can be increased or decreased. Shortening the two control lines that are attached to the front of the kite reduces the kite's angle of attack to the wind and causes a reduction in force generated by the kite. Lengthening those lines increases the kite's angle of attack, thus increasing the force generated. There is a limit on the force increase generated, however, as over-lengthening of the front lines will cause some four-line kites to stall.

Heretofore, kite owners had to decide whether they wanted a two-line kite, with its slower steering and lower likelihood of line entanglement, or a four-line kite with its quicker steering and on-the-fly angle of attack adjustment. An owner of a two-line kite who wanted a quicker steering kite and the ability to adjust the angle of attack on-the-fly could convert it to a four line kite by rolling up and sewing the pointed end and thereby creating a truncated end for four-line attachment. Two-line kites have two primary attachment points at each end plus at least one, usually two, line guides at each end, an and entirely different and additional set of attachment points for use when in a kite is converted for flying with four lines. This results in a redundancy of hardware attached to the kites, and these kites are more costly and complex than they need to be.

Owners of arched type four-attachment-point kites did not have the option of converting their kites to kites with two-line control, in that all attempts to do so prior to the invention disclosed herein were not successful.

In the prior art, various devices are known to provide wind power to drive sailboards and the like. For example, U.S. Pat. No. 4,708,078 issued to Legaignoux et al. discloses a kite controlled by a single line attached to each end of a wing in the form of a spherical segment. French patents issued to Legaignoux et al., U.S. Pat. Nos. 2,762,583 and 2,698,847, each show inflatable kites with four control lines, two attached to each end of the kite, but do not disclose a way to convert those kites to kites controlled by two lines.

Additionally, U.S. Pat. No. 5,366,182 issued to Roeseler et al shows an airfoil used to provide tractive force for pulling water skis and the like. One embodiment of the Roeseler Patent discloses the use of bridle lines for connecting the airfoil to the conveyance device being pulled, but these bridle lines do not work with arch-type kites, they do not impart the ability to steer the kite, nor do they offer the ability to de-power the kite.

Thus, there is a need for a control assembly that would allow four line-kites to be A converted to two-line controlled kites. A need further exists for such assemblies that would eliminate the need for redundant hardware on two-line kites, thereby reducing the cost and complexity of these kites. There is also a need for such assemblies that will allow a user to rapidly de-power a kite.

DISCLOSURE OF THE INVENTION

Accordingly, the following are objects of this invention:
1. to provide efficient control assemblies that will allow four-line arch-type kites to be converted to kites controlled by two lines;

2. to provide efficient control assemblies that will allow kites thus converted to be effectively steered;
3. to provide efficient control assemblies that will allow a user to avoid injury or equipment damage by rapidly de powering a kite;
4. to provide efficient control assemblies that reduce the time required to prepare the kite for use or storage;
5. to provide efficient control assemblies with the capability to stow the line when the kite is not in use;
6. to provide such assemblies in affordable, cost-effective forms; and
7. eliminate the need for redundant hardware currently found on most two-line kites. These and such other objects of the invention, as will become evident from the disclosure below, are met by the invention disclosed herein.

The double-up converter allows arch-type kites with truncated tips and four line attachment points to be flown with two lines. It can take a number of forms; some with lines only, and others with lines and two roughly triangular fabric panels, the panels having connectors to attach to the truncated ends of the kite.

The invention provides efficient control for deeply arched, four-attachment-point kites by using control line assemblies consisting of control lines, bridle lines, and cross-bridle lines. All embodiments provide line guides and line stops for rapidly de-powering a kite. In a number of embodiments, the length of various bridle lines are changeable.

According to the teachings of this invention, the control assemblies may be attached to each end of the kite by means of; knots, adjustable straps such as strap-and-buckle, or lines, such as adjustable shock cord arrangements. Additionally connections of bridle lines to control lines, bridle lines to bridle lines, and bridle lines to rings are made by means of; knots, such as lark's head knots or other knots that would be obvious to one skilled in the art.

The operator or assembler may adjust the performance of the kite by selectively changing the length of various bridle lines on the control assemblies or by changing the length of the cross-bridle lines. For example, if a less powerful kite is desired, angle of attack might be decreased by shortening the front primary bridle lines or triangle bridle lines; a more powerful kite might be obtained by lengthening the front primary bridle lines or triangle bridle lines. In another example, a user can decrease the turning radius of a kite by shortening the cross-bridle lines. The bridle line and cross-bridle line adjustments are accomplished by means of; buckles or other adjustment devices that would be obvious to one skilled in the art.

In an alternative embodiment, a pair of roughly triangular panels of fabric replace the triangle bridle lines, of the line-only version of the control assembly. These removable panels can be used to change the angle of attack, and they can include pouches for organizing and storing bridle lines.

The control assemblies described in this invention are equally adaptable for use on all kites with four line attachment points. These embodiments, and other embodiments described below, allow four-line kites to be converted to kites controlled by two lines. These embodiments and other embodiments described below, also allow a kite to be prepared for use or storage in a minimum amount of time relative to conventional four-line kites. All of these embodiments, and other embodiments described below, also allow a user to rapidly de-power a kite while it is in use.

BRIEF DESCRIPTION OF THE DRAWINGS

FIG. 2 is an enlarged view of one end of the kite structure shown in FIG. 1 detailing the line and bridle structures used in the embodiment of FIG. 1.

FIG. 3 is a schematic view of another preferred embodiment of the invention wherein a line guide is attached to the truncated end of the kite and the front bridle line runs through the line guide.

FIG. 4 is an enlarged view of one end of the kite structure shown in FIG. 3 detailing the line and bridle structures used in the embodiment shown in that figure.

BEST MODE OF CARRYING OUT THE INVENTION

Figure 1:
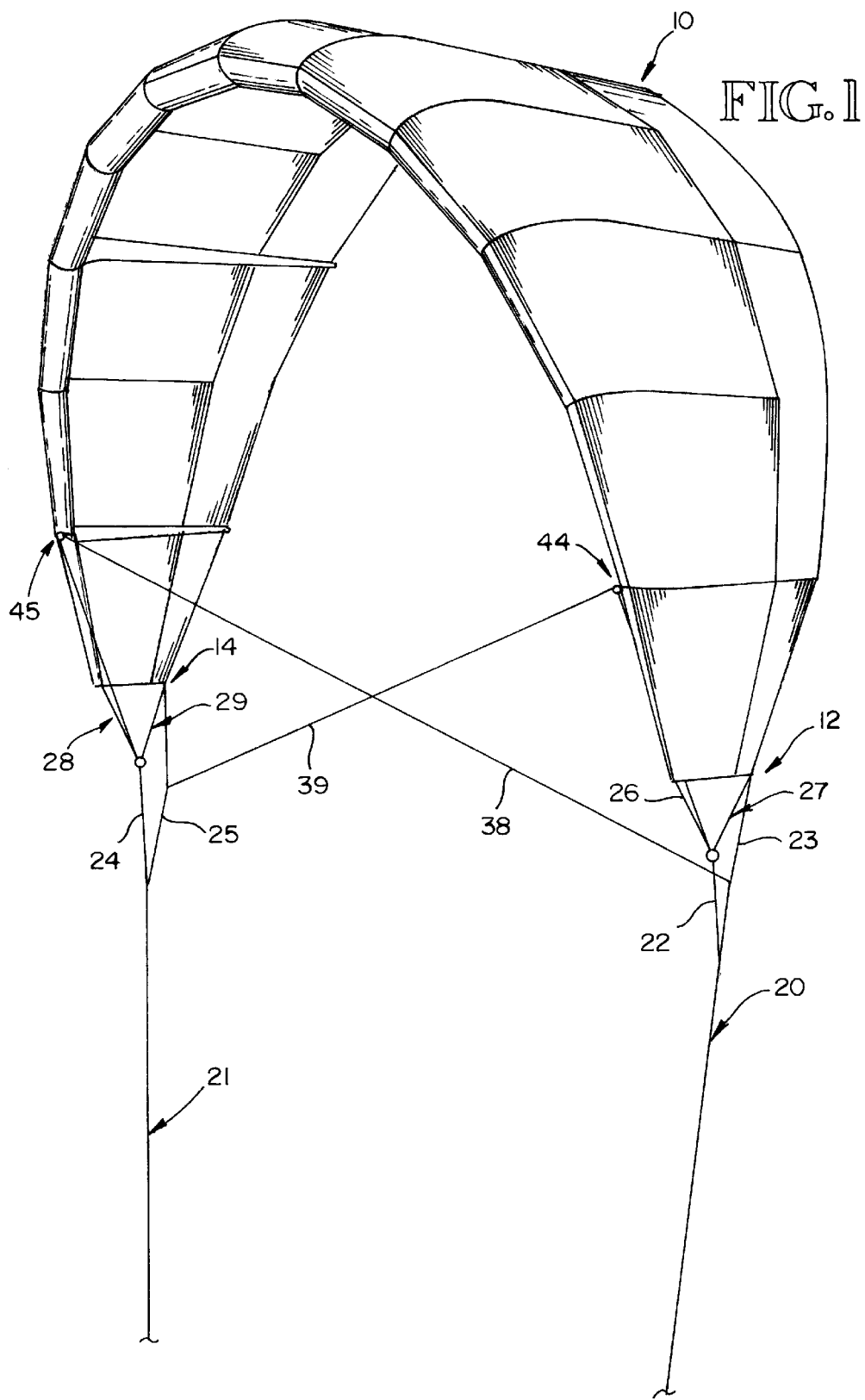
FIG. 1 is a schematic view of one preferred embodiment of the kite control assembly of the invention using a triangle bridle and a line guide attached to the leading edge of the kite.

Turning now to the drawings, the invention will be described in preferred embodiments by reference to the numerals of the drawing figures wherein like numbers indicate like parts. FIG. 1 is a perspective view of a kite structure wherein the kite 10 has truncated ends 12 and 14. The control line system includes a pair of control lines 20, 21, each connected to a pair of primary bridle lines, 22–25. The rear primary bridle lines 23 and 25 are attached to the truncated ends 12 and 14 of the kite 10 by means of knots, buckles, or adjustable shock chord type fasteners (not shown) The front primary bridle lines 22 and 24 are each attached to a ring. Triangle bridle lines 26–29 are attached to the kite in a manner similar to the rear primary bridle lines 23 and 25, and are connected to the front primary bridle lines 22 and 24 at the ring. Cross-bridle lines 38 and 39 are connected to the rear primary bridle lines and routed through line guides 44 and 45, which are attached to the leading edge of the kite, and then routed through the same ring as the front bridle lines 22 and 24 and connected to the control lines 20 and 21.

The resulting structure has performance characteristics similar to four-line kites in that it is capable of being turned by pushing the control bar away from the user on one side while pulling the control bar toward the user on the other side, and the angle of attack may be adjusted. The structure also has the benefit associated with two-line kites in that the control assembly allows the user to prepare the kite for use or storage in less time than that needed for a four-line kite.

Triangle bridle lines 26–29 control the angle of attack of the kite, and in a preferred embodiment may be changeable in length to increase or decrease the power of the kite. Making the front pair of triangle bridle lines 26 and 28 shorter would decrease the angle of attack and decrease the power of the kite.

Cross-bridle lines 38 and 39 control the turning of the kite by causing a twisting deformation of the truncated ends of the kite when the user pushes the control bar away from his or her body on one end while pulling it toward his or her body on the other end. For example, a user desiring to turn the kite to the left would push out on the right end of the control bar and pull in on the left end, thereby causing the rear of the left truncated end 14 and the front of the right truncated end 12 to twist in toward the center of the kite. In a preferred embodiment, cross-bridle lines 38 and 39 may be changeable in length to alter the turning radius of the kite. For example, a user can make a kite's turning radius smaller by shortening the cross-bridle lines or the turning radius can be made larger by lengthening the cross-bridle lines. The cross-bridle lines 38, 39 may also be slidably attached to the rearward primary bridle lines 22 and 25 so that the turning characteristics of the kite may be further altered. For example, a user can make a kite's turning radius smaller by sliding the cross-bridle attachments towards the control bar or the turning radius can be made larger by sliding the cross-bridle attachments towards the kite.

Changing the length of the triangle bridle lines 26–29 and the cross-bridle lines 38 and 39 is accomplished by means of buckles (not shown) or other adjustment devices or methods that would be obvious to one skilled in the art. Connections of bridle lines to control lines, bridle lines to bridle lines, and bridle lines to rings are made by means of knots, such as lark's head knots or other knots that would be obvious to one skilled in the art. Additionally, the line guides 44 and 45 used for the embodiment shown in FIG. 1 are pulleys. However, rings made of or coated with a material that would not cause excessive line wear, or smooth stainless steel rings, could be substituted as could other devices that would be obvious to one skilled in the art.

FIG. 2 is an enlarged view of one truncated end 12 of the kite structure shown in FIG. 1 detailing the line and bridle structures. In the preferred embodiment depicted, front primary bridle line 22 is connected to two triangle bridle lines 26 and 27 at ring 34. Ring 34 is made of a material that will not cause excessive wear on the lines. Ring 34 can also be metal coated with a material that will not cause excessive wear on the lines, or it can be made of smooth stainless steel. Triangle bridle line 26 is connected to the front corner of the truncated end of the kite, and triangle bridle line 27 is connected to the kite at the point where the rear primary bridle line 23 is connected. Cross-bridle line 39 is routed through line guide 44, through ring 34, and then connected to control line 20. In this embodiment, a user can rapidly de-power the kite by releasing tension on one of the control lines.

In an alternative embodiment (not shown), a pair of roughly triangular panels of fabric replace the triangle bridle lines, of the line-only version of the control assembly. The panels are attached to each end of the kite using adjustable straps, such as strap-and-buckle, or lines, such as adjustable shock cord arrangements. The attachment ring used in the embodiment described above is permanently sewn, or attached in ways obvious to those skilled in the art, to the apex of the triangular shaped panel. These removable panels function much like the triangular sections of cloth found at the tips of other kites, but they differ in three respects:

(1) They are detachable;
(2) The angle of attack of the kite can be adjusted, depending on the angle at which the triangles are attached; and
(3) They can include pouches for organizing and storing bridle lines.

The resulting structure has performance characteristics similar to four-line kites in that it is capable of being turned by pushing the control bar away from the user on one side while pulling the control bar toward the user on the other side, and the angle of attack may be adjusted. The structure also has the benefit associated with two-line kites in that the control assembly allows the user to prepare the kite for use or storage in less time than that needed for a four-line kite.

FIG. 3 is a perspective view of an embodiment of a kite structure that utilizes a different bridle line configuration, different placement of line guides 44 and 45, and the addition of line stops 46 and 47. The control line assembly includes a pair of control lines 20, 21, each bridled to a pair of primary bridle lines, 22–25. The rear bridle lines 23 and 25 are attached to the kite at the rear corner of the truncated ends. The line guides 44 and 45 are attached to the kite at the front corner of the truncated ends. Cross-bridle lines 38 and 39 are attached to the rear primary bridle line on their respective sides of the kite. The front bridle lines 22 and 24 are routed first through the line guides 44 and 45 and then through the line stops 46 and 47 and are then connected to the cross bridle lines 38 and 39.

The resulting structure has performance characteristics similar to four-line kites in that it is capable of being turned by pushing the control bar away from the user on one side while pulling the control bar toward the user on the other side, and the angle of attack may be adjusted. The structure also has the benefit associated with two-line kites in that the control assembly allows the user to prepare the kite for use or storage in less time than that needed for a four-line kite.

Primary bridle lines 22–25 control the angle of attack of the kite, and in a preferred embodiment may be changeable in length to increase or decrease the tractive power of the kite. Making the front pair of primary bridle lines 22 and 24 shorter would decrease the angle of attack and decrease the power of the kite.

Cross-bridle lines 38 and 39 control the turning of the kite by causing a twisting deformation of the truncated ends of the kite when the user pushes the control bar away from his or her body on one end while pulling it toward his or her body on the other end. For example, a user desiring to turn the kite to the left would push out on the right end of the control bar and pull in on the left end, thereby causing the rear of the left truncated end 14 and the front of the right truncated end 12 to twist in toward the center of the kite. In a preferred embodiment, cross-bridle lines 38 and 39 may be changeable in length to alter the turning radius of the kite. The cross-bridle lines 38, 39 may also be slidably attached to the rearward primary bridle lines 22 and 25 so that the turning characteristics of the kite may be further altered.

The control assemblies may be attached to each end of the kite by means of; knots, adjustable straps such as strap-and-buckle, or lines, such as adjustable shock cord arrangements. Changing the length of the primary bridle lines 22–25 and the cross-bridle lines 38 and 39 is accomplished by means of buckles (not shown) or other adjustment devices or methods that would be obvious to one skilled in the art. Connections of bridle lines to control lines and bridle lines to bridle lines are made by means of knots, such as lark's head knots or other knots that would be obvious to one skilled in the art.

FIG. 4 is an enlarged view of one end of the kite structure shown in FIG. 3 detailing the line and bridle structures. Front bridle line 22 passes through line guide 44 and line stop 46, and then connected to cross-bridle 39. In the embodiment depicted, the line guide is a pulley and the stop device is a bead. The bead is held in place by a knot on the side of the bead away from the pulley where the front bridle line attaches to the cross-bridle line. This embodiment allows a user to rapidly de-power the kite by releasing tension on the control line. Releasing tension on the control line will cause the cross-bridle line 39 to pull the front primary bridle line 22 through line guide 44, the kite then loses its arched shape and no longer provides tractive power. Line stop 46 prevents cross-bridle line 39 from being pulled through the line guide 44 and a knot (not shown) prevents line stop 46 from sliding along cross-bridle line 39. The preferred length of the front primary bridle line for this embodiment is generally 75% of the width of the kite in its flat position.

INDUSTRIAL APPLICABILITY

The invention has applicability to the field of kite control assemblies, in particular, this invention describes a control line assembly, for deeply arched kites with four line attachment points, that allows such kites to be flown with two lines and is capable of adjustment so as to vary the performance characteristics of such kites.

In compliance with the statute, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used with kites to provide power for recreational and other vehicles, it will be readily apparent to those skilled in the art that the invention can be adapted to other uses for kites as well, and therefore the invention should not be construed as being limited to kites used to provide power for vehicles. The invention is, therefore, claimed in any of its forms or modifications within the legitimate and valid scope of the appended claims, appropriately interpreted in accordance with the doctrine of equivalents.

What is claimed is:

1. A control line assembly for arch-type kites having truncated ends and at least two line attachment points per end, comprising:
    a left control line sub-assembly, a right control line sub-assembly, a left cross bridle line, a right cross bridle line, and a pair of line guides;
    wherein said line guides are connected to the leading edge of a kite near the front comers of the truncated ends of said kite;
    each of said control line sub-assemblies further comprises, a control line, a front primary bridle line, a rear primary bridle line, a pair of triangle bridle lines, and a ring;
    wherein said control line has a first end and a second end, said primary bridle lines have a bridle end and a connection end, and said triangle bridle lines have a ring end and a connection end;
    said first end of said control line is attachable to a kite control device and said second end is connected to said bridle ends of said primary bridle lines;
    said connecting end of said rear primary bridle line is connected to said kite at the truncated end of said kite;
    said connecting end of said front primary bridle line is connected to said ring;
    said ring ends of said triangle bridle lines are connected to said rings, and said connecting ends of said triangle bridle lines are connected to said kite;
    said cross-bridle lines each have a line end and a kite end;
    said line end is connected to said rear primary bridle lines on its respective side of said kite;
    said cross-bridle is routed through said line guide, then through said ring on the side opposite from said connection to said rear primary bridle line; and
    said kite end is connected to said control line on the side opposite from said connection to said rear primary bridle line.

2. The control line assembly of claim 1 wherein:
    said primary bridle lines are changeable in length;
    said triangle bridle lines are changeable in length; and
    said cross-bridle lines are changeable in length.

3. The control line assembly of claim 1 wherein said cross bridle lines are connected to said rear primary bridle lines and are slidable therealong.

4. The control line assembly of claim 1 wherein said line guides are pulleys.

5. A control line assembly for arch-type kites having truncated ends and at least two line attachment points per end, comprising:
    a left control line sub-assembly, a right control line sub-assembly, a left cross bridle line, a right cross bridle line, and a pair of line guides;
    wherein said line guides are connected to the leading edge of a kite near the front comers of the truncated ends of said kite;
    each of said control line sub-assemblies further comprises, a control line, a front primary bridle line, a rear primary bridle line, a triangular control panel, and a ring;
    wherein, said control line has a first end and a second end, said primary bridle lines have a bridle end and a connection end, and said control panel has a ring end, a connection end, and a line storage pocket;
    said first end of said control line is attachable to a kite control device and said second end is attached to said bridle ends of said primary bridle lines;
    said connecting end of said rear primary bridle line is connected to said kite at the truncated end of said kite;
    said connecting end of said front primary bridle line is connected to said ring;
    said ring is attached to said ring end of said control panel and said connecting end of said control panel is connected to said kite;
    said cross-bridle lines each has a line end and a kite end;
    said line end is connected to said rear primary bridle lines on its respective side of said kite;
    said cross-bridle is routed through said line guide, then through said ring on the side opposite from said connection to said rear primary bridle line; and said kite end is connected to said control line on the side opposite from said connection to said rear primary bridle line.

6. The control line assembly of claim 5 wherein said primary bridle lines are changeable in length; and said cross-bridle lines are changeable in length.

7. The control line assembly of claim 5 wherein said cross bridle lines are connected to said rear primary bridle lines and are slidable therealong.

8. The control line assembly of claim 5 wherein said line guides are pulleys.

9. A control line assembly for arch-type kites having truncated ends and at least two line attachment points per end, comprising:
    a left control line sub-assembly, a right control line sub-assembly, a left cross bridle line, a right cross bridle line, a pair of line guides, and a pair of line stops;
    wherein said line guides are connected to the leading edge of a kite at the front comers of the truncated ends of said kite;
    each of said control line sub-assemblies further comprises, a control line, a front primary bridle line, and a rear primary bridle line;
    wherein said control line has a first end and a second end, and said primary bridle lines have a bridle end and a connection end;
    said first end of said control line is attachable to a kite control device and said second end is connected to said bridle ends of said primary bridle lines;
    said connecting end of said rear primary bridle line is connected to said kite at the truncated end of said kite;

said connecting end of said front primary bridle line is routed first through said line guide on its respective side of said kite and then through one of said line stops;

said cross-bridle lines each has a line end and a kite end;

said line end is connected to said rear primary bridle lines on its respective side of said kite; and said kite end is connected to said front primary bridle line on the side opposite from said connection to said rear primary bridle line.

10. The control line assembly of claim 9 wherein said primary bridle lines are changeable in length.

11. The control line assembly of claim 9 wherein said cross bridle lines are connected to said rear primary bridle lines and are slidable therealong.

12. The control line assembly of claim 9 wherein said cross-bridle lines are changeable in length.

13. The control line assembly of claim 9 wherein said line guides are pulleys and said line stops are beads.

14. A control line assembly for arch-type kites having truncated ends and at least two line attachment points per end, comprising: a left control line sub-assembly, a right control line sub-assembly, a left cross bridle line, a right cross bridle line, a pair of line guides, and a pair of line stops; wherein, said line guides are pulleys and said line stops are beads;

said pulleys are connected to the leading edge of a kite at the front comers of said kite;

each of said control line sub-assemblies further comprises, a control line, a front primary bridle line, and a rear primary bridle line;

wherein said control line has a first end and a second end, and said primary bridle lines have a bridle end and a connection end;

said first end of said control line is attachable to a kite control device and said second end is attached to said bridle ends of said primary bridle lines;

said primary bridle lines are changeable in length;

said connecting end of said rear primary bridle line is connected to a kite at the truncated end of said kite;

said connecting end of said front primary bridle line is routed first through said pulley on its respective side of said kite and then through one of said beads;

said cross-bridle lines each has a line end and a kite end, and are changeable in length;

said line end is connected to said rear primary bridle lines on its respective side of said kite and is slidable therealong; and said kite end is connected to said front primary bridle line on the side opposite from said connection to said rear primary bridle line.

15. A control line assembly for arch-type kites having truncated ends and at least two line attachment points per end, comprising: a left control line sub-assembly, a right control line sub-assembly, a left cross bridle line, a right cross bridle line, a pair of line guides, and a pair of line stops;

wherein said line guides are pulleys and said line stops are beads;

said pulleys are connected to the leading edge of a kite at the front comers of said kite;

each of said control line sub-assemblies further comprises, a control line, a front primary bridle line, a rear primary bridle line and means for connecting said control line sub-assemblies to said kite;

wherein said control line has a first end and a second end;

said primary bridle lines have a bridle end, a connection end, means for changing the length of said primary bridle lines, and means for connecting said primary bridle lines to said control line;

said first end of said control line is attachable to a kite control device and said second end is connected to said bridle ends of said primary bridle lines;

said connecting end of said rear primary bridle line is connected to a kite at the truncated end of said kite;

said connecting end of said front primary bridle line is routed first through said pulley on its respective side of said kite and then through one of said beads;

said cross-bridle lines each has a line end, a kite end, means for changing the length of said cross-bridle lines, means for connecting said cross-bridle lines to said front primary bridle lines, and means for connecting said cross-bridle lines to said rear primary bridle lines;

said line end is connected to said rear primary bridle lines on its respective side of said kite and is slidable therealong; and said kite end is connected to said front primary bridle line on the side opposite from said connection to said rear primary bridle line.

* * * * *

UNITED STATES PATENT AND TRADEMARK OFFICE
CERTIFICATE OF CORRECTION

PATENT NO. : 6,520,454 B2
DATED : February 18, 2003
INVENTOR(S) : William K. Winner It is certified that error appears in the above-identified patent and that said Letters Patent is hereby corrected as shown below:

Column 5,
Line 24, the word "comer" should be -- corner --;
Lines 64 and 66, the word "comer" should be -- corner --;

Column 8,
Line 8, the word "comer" should be -- corner --; and

Column 10,
Line 14, the word "comer" should be -- corner --.

Signed and Sealed this

Eighth Day of April, 2003

JAMES E. ROGAN
*Director of the United States Patent and Trademark Office*